No Printed Specification Available
6693X
J. Wallace.
Ship's Implement.
No. 9 Patented Aug. 9, 1831.
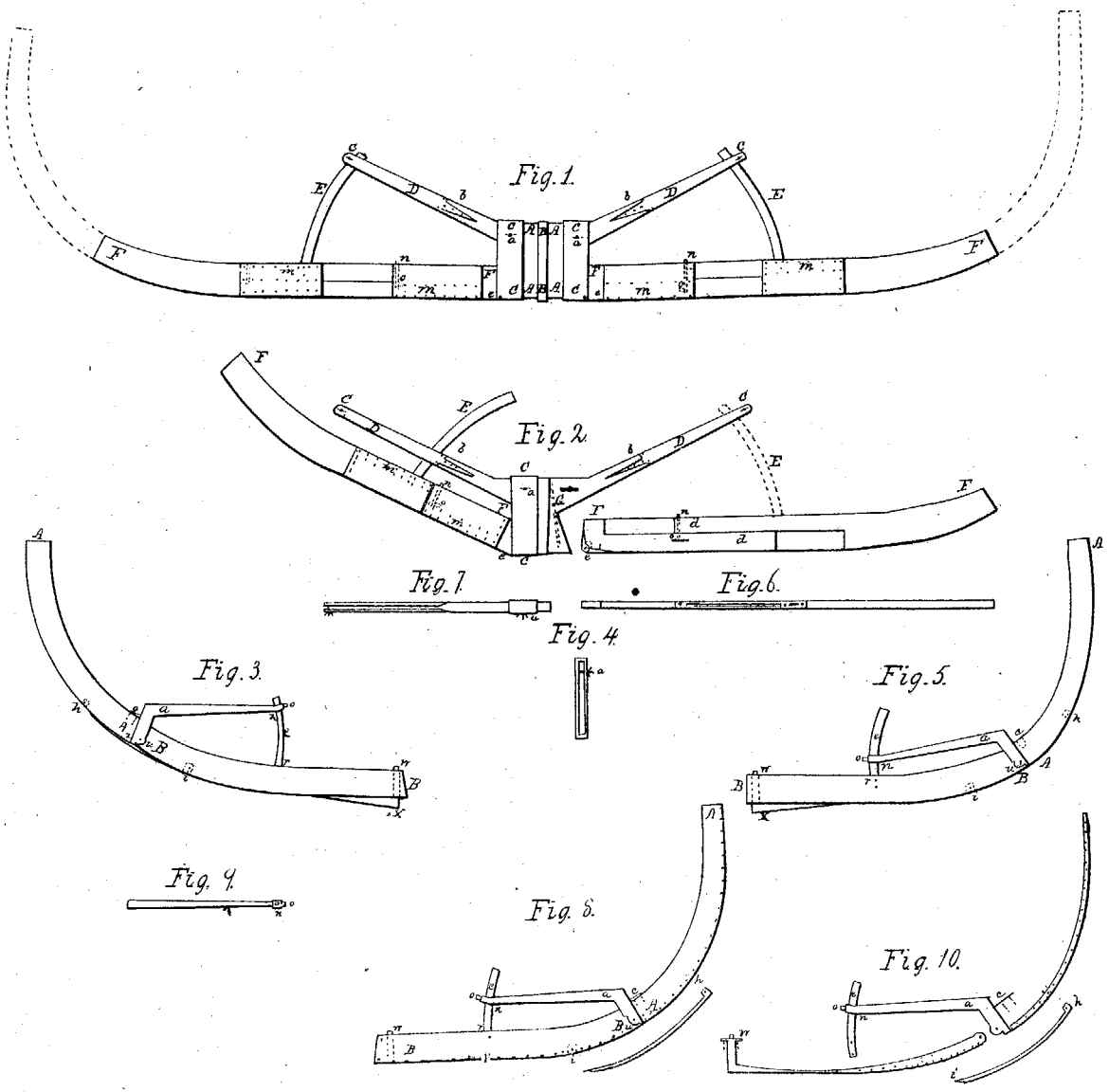
N. PETERS, PHOTO-LITHOGRAPHER, WASHINGTON, D. C.

Aug 9 1831 [illegible]

James Wallace,

Letters Patent.

The schedule referred to in these Letters Patent and making part of the same containing a description in the words of the said James Wallace himself of his improvement in graduating moulds for moulding and shap-ing the timbers of boats and vessels, —

There are two separate moulds or patterns which will shape all the timbers of a boat or vessel. Figures 1 & 2 on the annexed drawings present a side view of one mould. Figures 3. 5. & 8. presents a like view of the other mould, the parts coloured red are of wood being of board or plank the parts in blue are of iron The red parts A A on figure 1. are in the place of the keel of the boat or vessel and may be of any width or dimensions required. a band of iron B.B. passes around the centre of the mould to give strength and firmness. the blue parts C.C. are moveable iron bands which pass around the keel part of the mould and move either way as the keel is to be made wider or narrower. Figure 4 presents a section of these bands, at a is a thumb screw to fasten the bands C.C. when at the right place, — The parts D are arms or shafts made fast to the upper half of the centre part or keel part of the mould, and are set elevated to such an angle as will enable the lower moveable parts E.E. when raised to give as much curve or dead rise as is wanted to any timber A part of this arm or shaft is of wood, its junction with the centre piece may be seen at G on fig 2. which part is there represented as uncovered or without the iron band, the extreme part of the arm is iron and is joined to the wooden part by a tongue at 6. This iron part is split nearly its whole length as may be seen by its upper surface as in figure 7. so that a curved gauging slide E can move backward and forward in the shaft and between the two slips, At the end of this arm at at c, a thumb screw passes through, so that when loosed the curved
rod or slide can move either way as wanted and when made tight
the lips of the arm are compressed and hold fast in its place the curve
rod E. The mould F.F. is fastened by a rivet or hinge to the
lower corner of the iron band C.C. at c, it will of course move
either way as the band C.C. moves, it is moveable on this rivet or
hinge and can be dropt to a floor level as in figure 1. or be raised
up towards the arm D. as in a part of Figure 2, as the timbers of
the boat or vepel may require to be moulded, This lower part of the
mould F.F. on Figures 1 & 2 is composed of two pieces of board or
plank. halved and lapped so as to slide past each other as may be
seen at d.d. on Figure 2, a sheet iron band passes nearly around
each piece as M, M, on Figure 1. and each band forms a socket
into which the narrow end of the other piece enters and slides.
The mould may be contracted until the band M.M. touch
each other, again the mould may be extended until the ends
d.d. as on Figure 2. are drawn almost out of their socket. An
iron plate represented by Figure 6, is fastened on to the upper edge
of this bottom part of the mould. this iron plate has an opening or
mortise or slit as long as the distance the part d.d. move or slide
a screw n on the upper edge of the floor mould F.F. passes through
the slit or opening. on the edge plate and enters a fixed nut at o.
At whatever distance the ends d.d. are drawn from their socket
the screw n may be turned and holds them fast there.
The curved gaugeing rod E is made fast to the floor mould so as
to be immoveable at that joint. — The other ends of E passes through
the slit or opening in the arm D. and is there held fast, at any de-
sired position by means of the screw at c,
Thus it will be seen that the horizontal motion of the outer part
of the floor mould enables one to make timbers of any desired length
and the perpendicular circular motion of the whole base F.F. on one
side the keel around the hinged axis at c. enables one to elevate
these timbers from the keel at any desired pitch or angle
or at any dead rise ———

Thus far illustrations have been by figures 1 & 2 principally.
The other mould or pattern called the futtock mould is represented
by the figures 3, 5, & 8.
This mould like the other is composed of board or plank and
is in two parts A.A. & B.B. on the part A.A is an elbow of iron a.
made fast with screws or rivets. Figure 9 presents a view of this
elbow when the edge falls on its top. The back of this elbow is made firm
by an iron layer or plate c. nailed or screwed on the upper edge of the
board A.A. The lower edge of A.A. is grooved and inlaid with an
iron rod or strip made fast and fitted even with the lower edge of
the board A.A. This makes a hard surface to resist the
marking iron when this pattern is used and also stiffens the mould
the extreme end of this elbow a. has a hole at n. through which
passes the curvilinear plate e. a screw in the end of the arm at o.
keeps this plate in any place required. This plate is fastened immov-
ably into the wood mould B.B. at r. and extends up through the
hole or eye at the end of the arm a. The wood part of the
mould B.B. is fastened to the lower end of the elbow, a at u.
by a rivet or hinge on which it may turn. This part B.B. is
grooved on its lower edge and a plate of iron is inserted made fast
at the end next to the middle of the mould. To the other end of this
plate a screw bolt is attached which passes up through the extreme
end of B.B. at w. by turning this screw the iron plate may be
forced down below the wood part of the mould as at x. in Figures
3 & 5. in order to alter the curve.
When the wood part B.B. of this futtock mould is bent down
on its hinge it destroys the regular curve as at z on Fig 3. to restore
a proper sweep or curve a steel spring h.i. is fastened to the mould
A.A. at h. The other end of this spring enters a socket at i in the
band of the wood mould B.B.
The elbow and the different iron plates of this futtock mould are
represented by figure 10. — It will be seen that by these moulds
heads and [illegible] can be constructed with the greatest possible accuracy and exactness, since it is not necessary, as in the common mode of building to trust to the uncertain measurement of the eye – also any number of boats or vessels may be built exactly alike, – also a boat or vessel can be shaped exactly :– like one of a larger or smaller size.

:– The following is an explanation of the mode of using and contains practical directions how to use the preceding described moulds and how to form and construct them –

Form a model of any convenient size of the boat or vessel to be built; taking care that the outside curve be regular flattening alike towards the bow, and the reverse towards the stern; thus the boat will have the best possible shape and pass easily through the water, cut this model into two equal parts from the stern to the bow, so as to make two equal demi models –

Use one demi model space it off into sections and with a sawing box and fine saw separate the demi model at say each third sectional mark by perpendicular cuts, also make a diagonal perpendicular cut that will, on the scale, divide the bow about equally from the stem to the first vertical section.

The section being made smooth and laid on paper; the outer lines thereof are easily transferred to the section paper by a pen or pencil.

The sections being they transferred to paper and a scale of proportion determined on the same figures are laid down on a moulding floor, — The moulds are both made from the middle or widest section; Place them on the draft: board and when they are brought to compare with the draft, set down on the minute book opposite the number of the section, the inches and parts of an inch measuring from the arm of the mould directly over the circular line to the top of the mould, Having finished taking every third section according to the cuts of the model, divide the intermediate spaces proportionally and take the remainder, with the minute book the moulds are prepared for business. Dated July 11th 1831

Witnesses { Moses Chapin
{ Daniel C. Marsh }

James Wallace